United States Patent [19]

Fincke

[11] 4,327,592
[45] May 4, 1982

[54] HYDROSTATIC BEARINGS FOR A TURBINE FLUID FLOW METERING DEVICE

[75] Inventor: James R. Fincke, Rigby, Id.

[73] Assignee: The United States of America as represented by the United States Department of Energy, Washington, D.C.

[21] Appl. No.: 145,940

[22] Filed: May 2, 1980

[51] Int. Cl.³ .............................................. G01F 1/10
[52] U.S. Cl. ................................................ 73/861.91
[58] Field of Search ...................... 73/861.8 B, 861.89, 73/861.91, 861.92; 308/9, DIG. 1

[56] References Cited

U.S. PATENT DOCUMENTS

| | | | |
|---|---|---|---|
| 846,927 | 3/1907 | Lasche | 308/9 |
| 3,232,680 | 2/1966 | Clark | 308/9 |
| 4,111,046 | 9/1978 | Amemori et al. | 73/861.91 |
| 4,193,644 | 3/1980 | Miyashita et al. | 308/9 |

OTHER PUBLICATIONS

Bisson et al., Advanced Bearing Technology, Ch. 4, pp. 97–108, NASA SP.-38, (1964).

Cusano et al., "Design of Multi-Recess Hydrostatic Journal Bearings for Minimum Total Power Loss" in Transactions of ASME J. of Engineering for Industry, 1974, pp. 226–232.

*Primary Examiner*—Herbert Goldstein
*Attorney, Agent, or Firm*—Paul A. Gottlieb; Richard G. Besha; James E. Denny

[57] ABSTRACT

A rotor assembly fluid metering device has been improved by development of a hydrostatic bearing fluid system which provides bearing fluid at a common pressure to rotor assembly bearing surfaces. The bearing fluid distribution system produces a uniform film of fluid between bearing surfaces and allows rapid replacement of bearing fluid between bearing surfaces, thereby minimizing bearing wear and corrosion.

4 Claims, 3 Drawing Figures

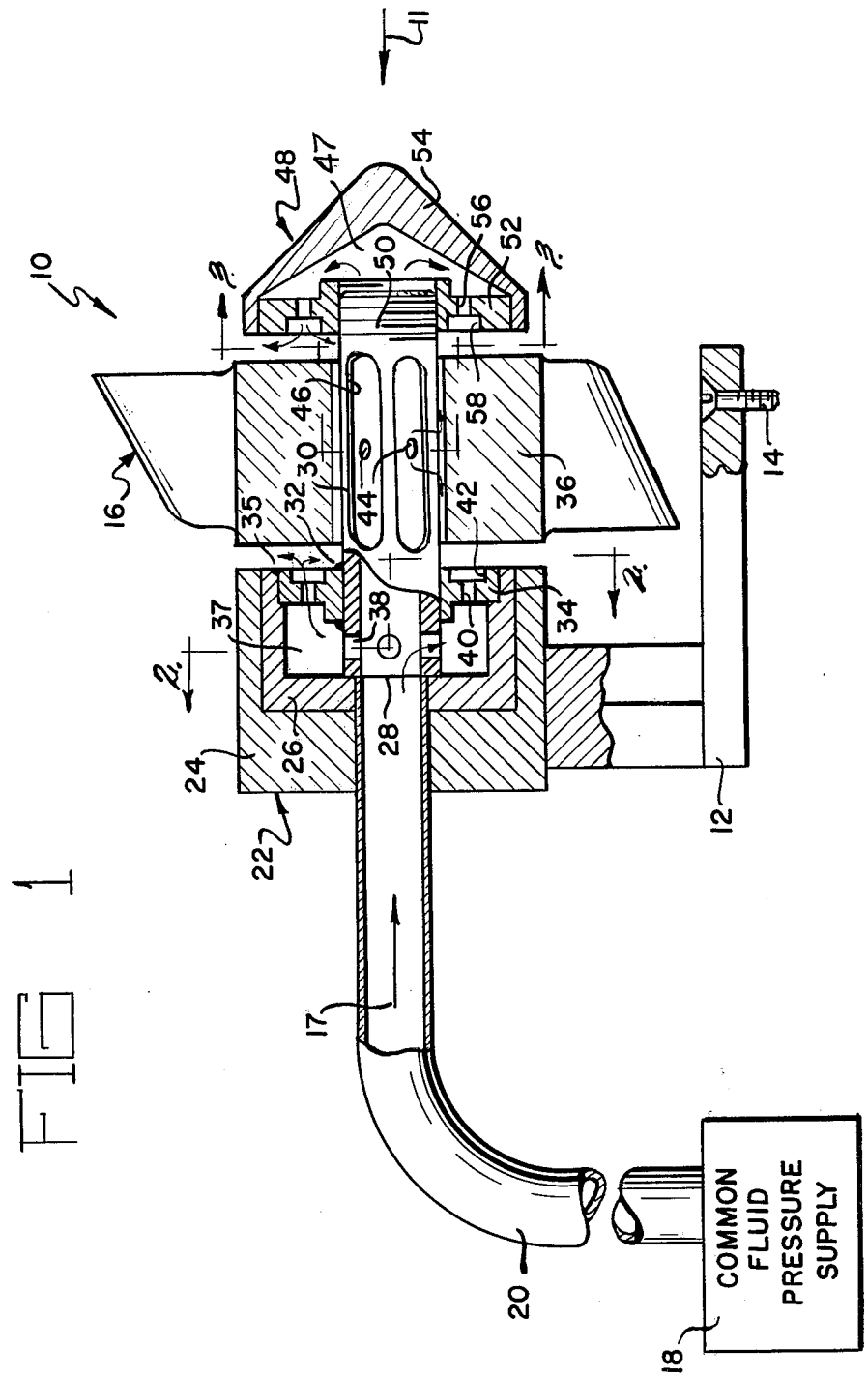

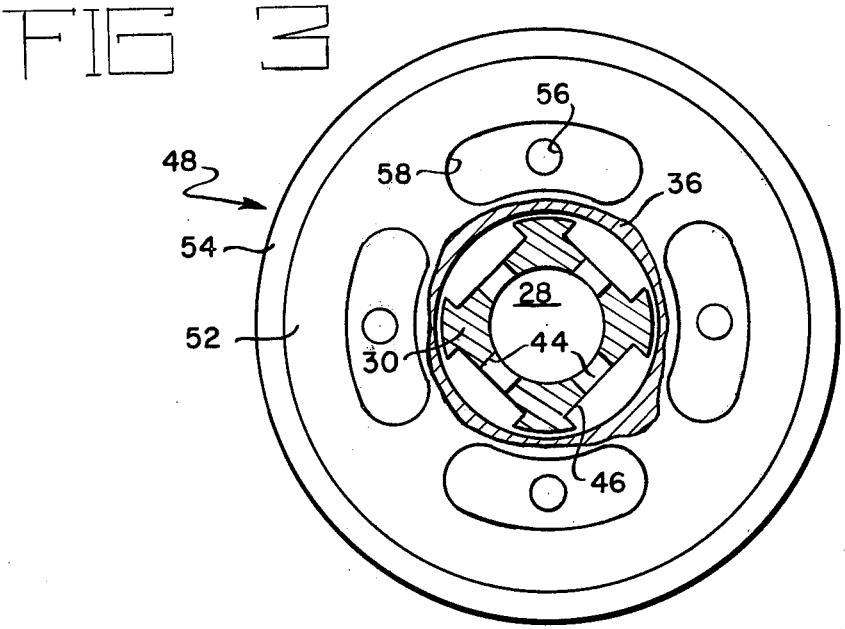
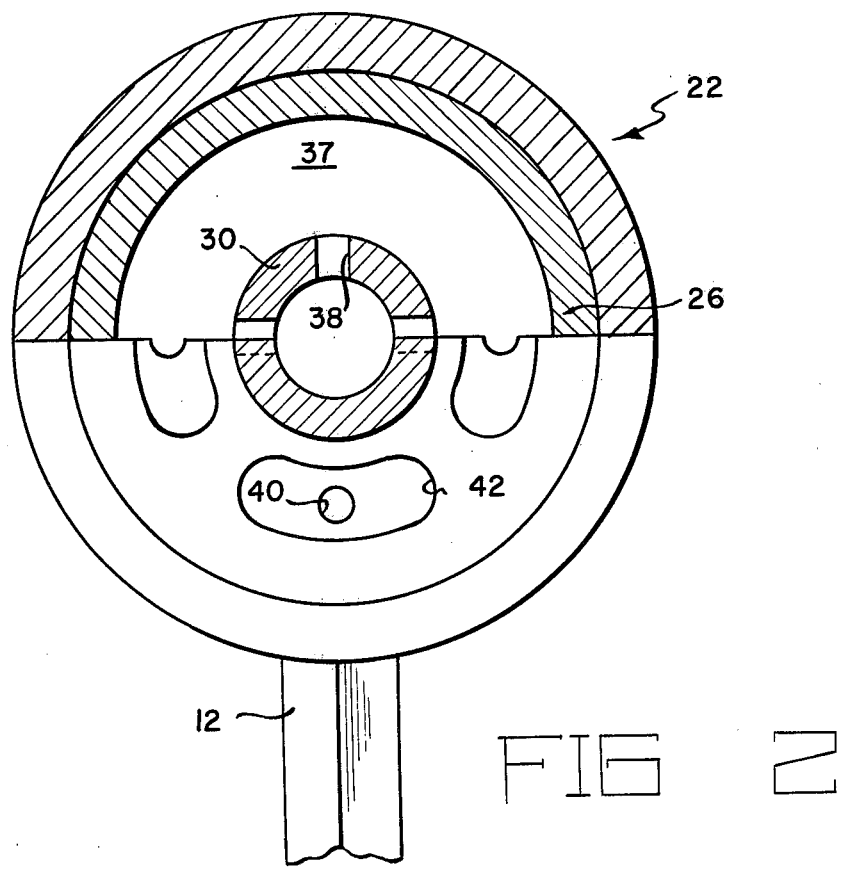

HYDROSTATIC BEARINGS FOR A TURBINE FLUID FLOW METERING DEVICE

CONTRACTUAL ORIGIN OF THE INVENTION

The United States Government has rights in this invention pursuant to Contract No. EY-76-C-07-1570 between the U.S. Department of Energy and EG&G Idaho, Inc.

BACKGROUND OF THE INVENTION

This invention represents an improvement in bearings utilized in rotor assembly fluid metering devices. The intended application of the invention is in the metering of flow parameters in a high pressure water steam line in relatively inaccessible locations. In such an environment, conventional unlubricated bearings typically suffer from mechanical wear and bearing corrosion. Corrosion products are also generated from the pipes enclosing the flowing fluid, and the resulting particulate corrosion matter can cause seizure of conventional bearings. Attempts have been made to prevent bearing to shaft contact by use of hydrodynamic bearings, but this type of bearing requires a minimum critical rotational velocity before the rotational forces induce the formation of complete fluid film between the moving parts. E. E. Bisson and W. J. Anderson, *Advanced Bearing Technology*, NASA, 1964. As a consequence, bearing lifetime is still substantially reduced by low rotational velocity mechanical wear and corrosion effects. Hydrostatic bearing systems have also been developed, which provide for pressurized injection of fluid between bearing surfaces; however, such systems require complex plumbing and multiple bearing fluid supply sources, which often result in pressure differences among the different bearing cavities of the device. C. Cusano and T. F. Conry, Trans. of ASME, J. Eng. for Ind. (Feb. 1974).

It is therefore, an object of the invention to provide a hydrostatic bearing fluid system with a common fluid pressure supply system, thereby establishing a uniform bearing fluid pressure throughout the system.

It is a further object of the invention to provide a means for rapid replacement of fluid between all bearing surfaces, in a hydrostatic bearing fluid system, thereby minimizing crevice corrosion.

Additional objects, advantages, and novel features of the invention will be set forth in part in the description which follows, and in part, will become apparent to those skilled in the art upon examination of the following or may be learned by practice of the invention. The objects and advantages of the invention may be realized and attained by means of the instrumentalities and combinations, particularly pointed out in the appended claims.

SUMMARY OF THE INVENTION

The present invention relates to the use of hydrostatic fluid bearings for the support of rotating parts in devices such as turbines and compressors. The invention described herein includes a rotor assembly in a fluid metering device with bearing fluid supplied to all bearing interfaces by a distribution means which yields an equilibirum pressure throughout the system and also results in rapid replacement of bearing fluid between bearing surfaces.

BRIEF DESCRIPTION OF DRAWINGS

FIG. 1 is a cross section of the bearing fluid distribution system as a whole;

FIG. 2 shows a cross section through line 2—2 of FIG. 1;

and

FIG. 3 shows a cross section through line 3—3 of FIG. 1.

DETAILED DESCRIPTION OF THE PREFERRED EMBODIMENT

The preferred embodiment is shown in FIGS. 1—3. In FIG. 1, fluid meter assembly 10 is bolted to assembly mount 12, which may be attached with mounting bolts 14 to the interior of pipelines containing fluid to be metered. In the embodiment shown, the fluid flow to be metered is from right to left as shown by arrow 11. During fluid flow, rotor assembly 16 is separated from all adjacent component surfaces by a film of hydrostatic bearing fluid 17 injected under pressure. Common fluid pressure supply 18 delivers bearing fluid at a constant pressure to all bearing surfaces through tubing 20 to fluid meter assembly 10. Bearing fluid 17 passes through tubing 20, which enters downstream bearing assembly 22. Within downstream bearing assembly 22, tubing 20 passes through cylindrical housing 24 and concentric housing 26 and terminates at interior inlet 28 of housing 26.

Rotor shaft 30 is attached by weldments 32 to interior housing 26 such that shaft 30 is concentrically mated to tubing 20 at interior inlet 28. Enclosure of bearing assembly 22 is completed by attachment of downstream thrust bearing section 34 to interior housing 26 by weldments 35. Downstream thrust bearing section 34 encircles rotor shaft 30 and fits in a recess in housing 26 such that the exterior face of section 34 is flush with the bearing surface of assembly 22 facing the bearing surface of rotor hub 36.

Bearing fluid 17 enters downstream bearing reservoir 37 of assembly 22 through a plurality of downstream shaft orifices 38 in rotor shaft 30 and exits reservoir 37 through a plurality of downstream thrust orifices 40 in downstream thrust bearing section 34, shown in FIG. 2. Referring to FIG. 2, thrust orifices 40 pass through section 34 and terminate in downstream thrust bearing pockets 42 which act to spread the flow of bearing fluid 17 before impacting upon the adjacent face of rotor hub 36. The intent is to spread the fluid flow pattern over the entire bearing surface in order to avoid metal-to-metal contact during bearing operation and to replace all fluid within the interface of the bearings, thereby minimizing crevice corrosion effects. Bearing fluid 17 also is injected through a plurality of rotor shaft orifices 44 between the exterior surfaces of rotor 30 and the inside radial surface of rotor assembly 16. Rotor shaft orifices 44 exit rotor shaft 30 and terminate in shaft pockets 46 which act to spread the flow of bearing fluid 17 along the entire bearing interface between rotor shaft 30 and the inside radial surface of rotor hub 36. Again, the purpose is to avoid metal-to-metal contact and minimize crevice corrosion effects by rapid replacement of fluid at bearing interfaces.

Rotor shaft 30 terminates within upstream bearing reservoir 47 of upstream bearing assembly 48, rotor shaft 30 having an exterior threaded surface 50 engaged to upstream thrust bearing section 52. Enclosure of assembly 48 is completed by attachment of bearing flow cap 54 over upstream thrust bearing section 52. Bearing fluid 17 enters reservoir 47 of assembly 48 through the open end of rotor shaft 30 and exits assembly 48 through a plurality of upstream thrust orifices 56 in upstream thrust bearing section 52, shown in face view in FIG. 3. Upstream thrust orifices 56 pass through section 52 and terminate in upstream thrust bearing pockets 58 which spread the flow of bearing fluid 17 to avoid metal-to-contact during bearing operation and also to minimize crevice corrosion effects by rapid replacement of fluid at bearing interfaces. As shown in FIG. 3, one possible geometry for bearing pockets 58 is of concentric inner and outer arc sides of a circle and closed semi-circular ends.

During operation of fluid meter assembly 10, common fluid pressure supply 18 provides bearing fluid 17 at one common pressure to all bearing surfaces. An intervening fluid film is interposed between bearing surfaces at all times regardless of the presence or lack of hydrodynamic forces operating on rotor assembly 16. The uniformity of bearing fluid pressure from common fluid pressure supply 18 gives rise to extremely stable mechanical operation, thereby minimizing mechanical wear of bearing surfaces. The design of the bearing distribution system insures complete coverage of bearing interfaces with a uniform film of bearing fluid 17 at a constant pressure. In addition to improvement of mechanical stability of bearing operation, the bearing fluid distribution system results in rapid replacement of fluid between bearing surfaces. Rapid fluid replacement minimizes crevice corrosion effects by eliminating build-up of contaminants and eliminating stagnant fluid collection, all of which can prevent crevice corrosion being the limiting factor in fluid bearing operation.

The embodiment of the invention in which an exclusive property or privilege is claimed are defined as follows:

1. In a fluid metering device, which includes a rotor hub encircling a stationary rotor shaft having orifices therein about which said rotor hub is capable of rotating, an upstream and a downstream bearing assembly and affixed to an upstream and downstream end, respectively, of the rotor shaft, an upstream and a downstream thrust bearing section, a common pressure supply of bearing fluid, a means coupled to said supply for distributing bearing fluid to bearing surfaces between the rotor hub and the rotor shaft and between the rotor hub and the upstream and downstream bearing assemblies, said means for distributing fluid including orifices in said rotor shaft and said upstream and downstream bearing assemblies for tranporting bearing fluid to the bearing surfaces, said means for distributing bearing fluid equilibrating the bearing fluid pressure throughout the bearing volume, thereby permitting continuous supply of bearing fluid to said bearing surfaces, the improvement comprising a separate shallow pocket positioned at the center termination of each orifice in said rotor shaft, said upstream thrust bearing section, and said downstream thrust bearing section.

2. The device of claim 1 wherein said pocket of said rotor shaft orifice extends along the length of the bearing surface between the rotor and rotor shaft.

3. The device of claim 2 wherein there is a plurality of rotor shaft pockets and said rotor shaft pockets are sufficiently wide to effectuate bearing fluid distribution along the entire area of bearing surface.

4. The device of claim 3, wherein there is a plurality of thrust pockets in said upstream thrust section and said downstream thrust section with said pockets having concentric inner and outer arc sides of a circle and closed semi-circular ends, and said thrust pockets are sufficiently wide to effectuate bearing fluid distribution along the entire bearing interface.

* * * * *